Sept. 26, 1967 J. KRITZ 3,343,492
SYSTEM FOR ULTRASONIC TRANSLATION OF ELECTRICAL ENERGY
Filed May 28, 1965 2 Sheets-Sheet 1
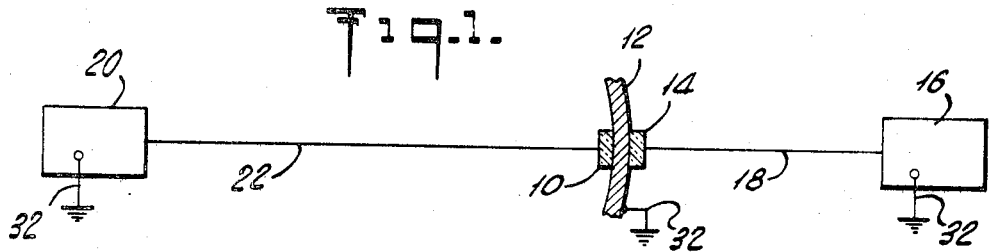
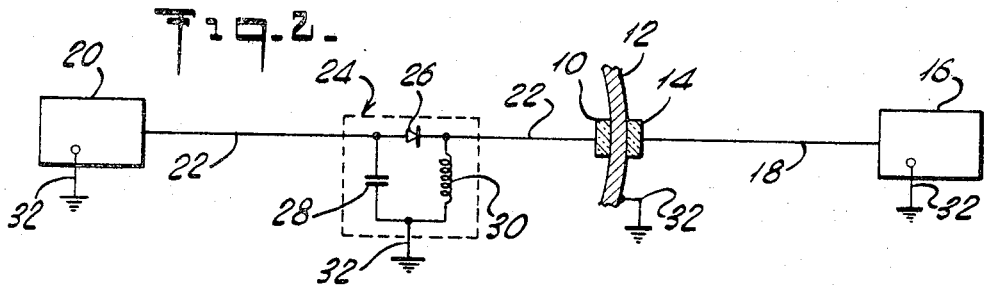
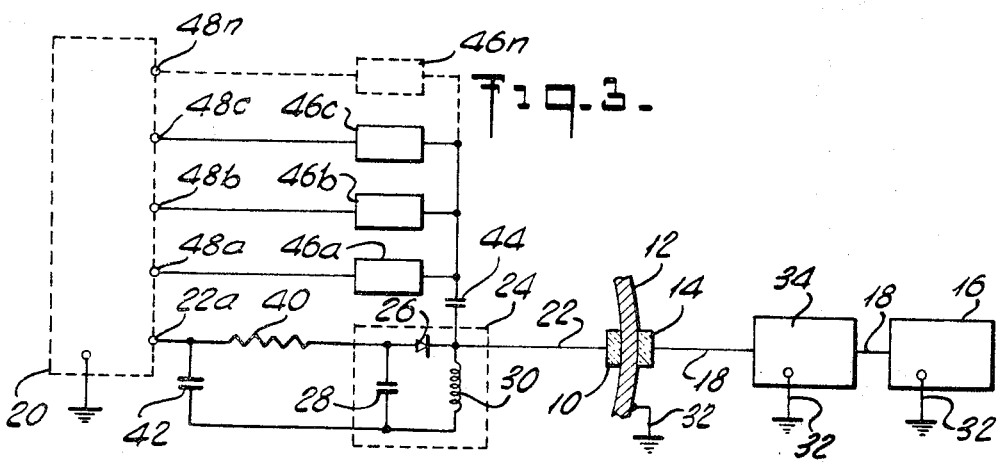
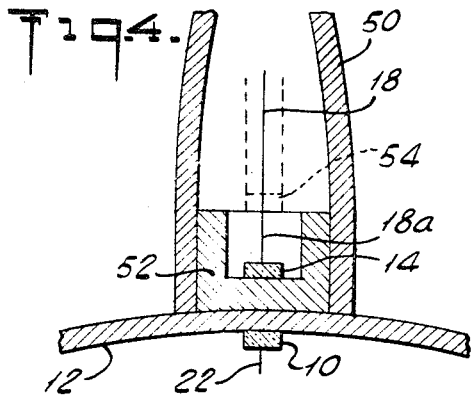
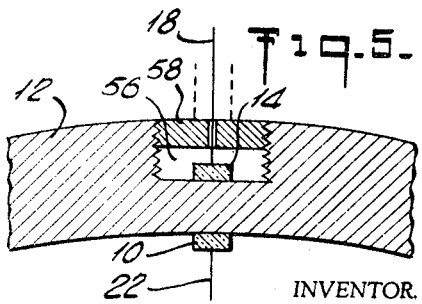
INVENTOR.
JACK KRITZ
BY
Nolte & Nolte
ATTORNEYS Sept. 26, 1967     J. KRITZ     3,343,492
SYSTEM FOR ULTRASONIC TRANSLATION OF ELECTRICAL ENERGY
Filed May 28, 1965     2 Sheets-Sheet 2

INVENTOR
JACK KRITZ
BY
Nolte & Nolte
ATTORNEYS

United States Patent Office 3,343,492
Patented Sept. 26, 1967

3,343,492
SYSTEM FOR ULTRASONIC TRANSLATION
OF ELECTRICAL ENERGY
Jack Kritz, Westbury, N.Y., assignor to Janus Products,
Inc., Syosset, N.Y., a corporation of Delaware
Filed May 28, 1965, Ser. No. 459,952
14 Claims. (Cl. 102—70.2)

This application is a continuation-in-part of co-pending application Ser. No. 235,263, filed Nov. 11, 1962, and now abandoned.

This invention relates to a system for transmitting electrical energy. More particularly, this invention relates to a system for transmitting electrical information and/or power by means other than conventional transmission links (i.e., conductors and electromagnetic radio waves).

In many instances it is either impossible or highly impractical to effect a conventional electrical connection between a load and a source of electrical energy. In many other instances it is highly desirable that a direct electrical connection be avoided even though it would be possible to do so. For example, it is highly desirable to arm and disarm a warhead-carrying missile with electrical power and command signals without breaching the missile's skin to allow the entrance of electrical conductors. For another example, it is highly desirable to preserve the hermetic integrity of space capsules, satellites, the cabins of high-altitude aircraft, the hulls of ships and submarines, etc., while translating electrical energy between such a sealed vessel and a station situated without the vessel.

Although the invention is, hereinafter, principally described and illustrated in the accompanying drawing figures as being useful for arming and disarming a missile, it is to be understood that the utility of the invention is not so limited.

A main object of this invention is to transmit electrical power without the use of conventional transmission media.

Another object of the invention is to arm or disarm (enable actuation or render inoperative) a weapon (e.g., a warhead-carrying missile) without the necessity of breaching the weapons housing.

Another object of the invention is to arm or disarm weapons by a system, and with apparatus, which is not susceptible of being jammed, prematurely operated, or rendered inoperative by enemy activity.

Another object of the invention is to arm or disarm weapons by a system and with apparatus which is relatively insensitive to such atmospheric disturbances as shock, vibration and temperature.

Another object of the invention is to provide a system and apparatus for arming or disarming missiles; the system and apparatus provided being compatible with the various presently available launching vehicles and launching techniques.

Another object of the invention is to provide a system and apparatus for arming or disarming missiles; the system and apparatus provided being relatively safe, highly reliable and economical.

The objects of the invention are accomplished by transmitting electrical power in the form of ultrasonic energy, thus obviating the need for a direct or electromagnetic transmission link between the source and load. The electrical energy of the source is fed to a suitable acoustical path, at which point it is converted to ultrasonic energy. Sound energy is propagated along this path, and thereafter reconverted to electrical energy at a point in proximity to the electrical load. With high quality transducers and a good conducting path, considerable amounts of power may be transmitted practical distances. If desired, it is also possible to transmit information modulated energy via such an acoustical link.

Other objects, the various features and advantages of the invention, as well as a fuller understanding thereof, are to be had by referring to the following detailed description and claims, taken in conjunction with the accompanying drawings, in which:

FIG. 1 is a generalized schematic diagram which illustrates the system and apparatus of the present invention.

FIG. 2 is another schematic diagram illustrating the way in which D.C. power is translated to load.

FIG. 3 is another schematic diagram illustrating the way in which D.C. power and information-bearing command signals are translated to the arming and safing circuitry.

FIG. 4 is a fragmentary cross-section view showing a missile carried on a pylon, within which there is situated a portion of the apparatus of the present invention.

FIG. 5 is a fragmentary cross-section showing an alternative way of arranging the transducers on missile.

Figure 6:
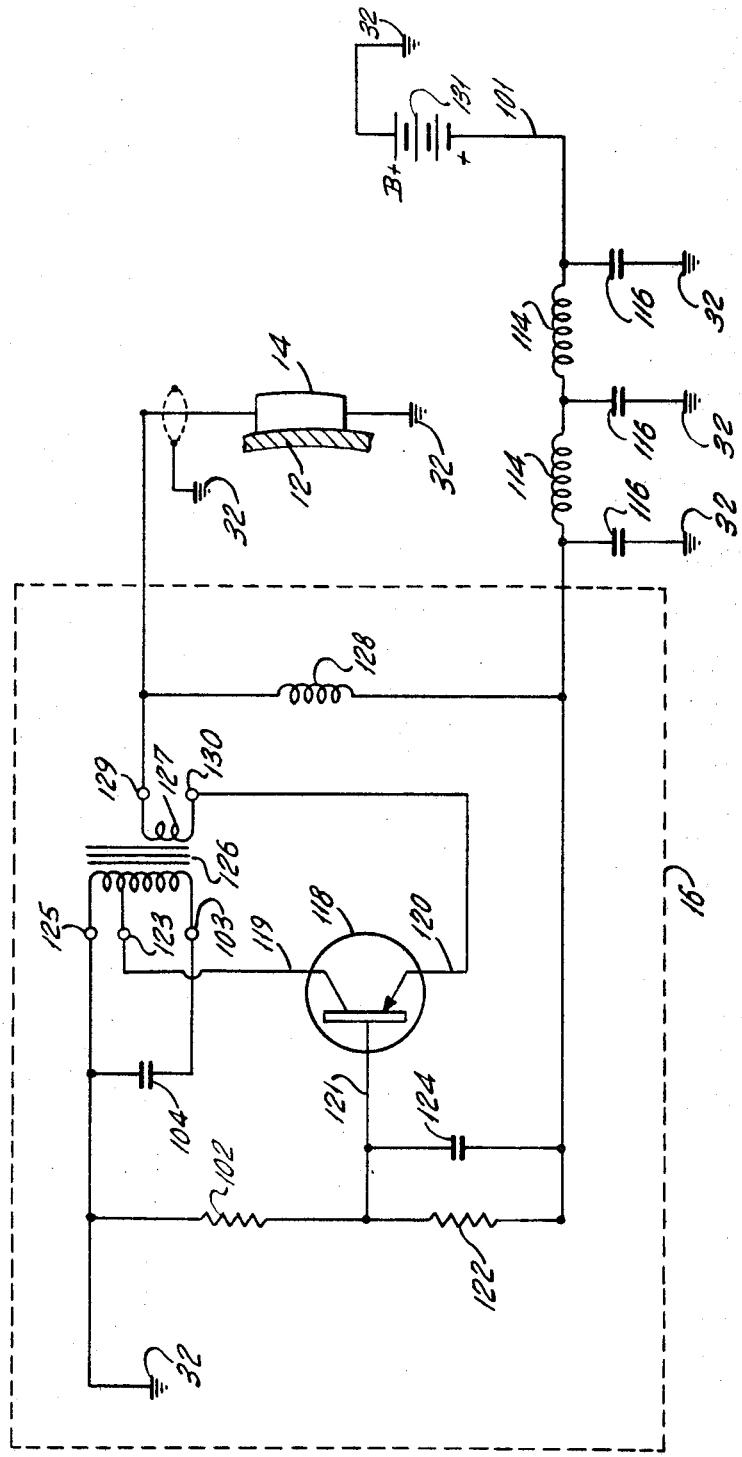
FIG. 6 is an electrical schematic diagram showing an oscillator for electrically exciting the transmitting transducer designed so that it automatically locks onto the resonant frequency of the housing to which the transducer is attached.

As is shown at FIG. 1 in schematic form, a first transducer 10 is mounted so that it is in intimate contact with the inner surface of the missile's skin 12. Situated externally of the missile skin 12 is a like transducer 14 which is adapted for being placed in intimate contact with the outer surface of the skin 12. Each transducer, 10 and 14, is fashioned from a piezoelectric material such as barium titanate, quartz, lead zirconate-titanate, or tourmaline. Each transducer, 10 and 14, is intended to operate in its thickness mode; i.e., vibrate in directions normal to their planar surfaces. For operation at carrier frequencies of between 1 and 5 megacycles, each transducer may be a one-half inch, or less, diameter disc having a thickness of 0.01 inch or less. However, these values are purely illustrative. It is to be understood that the system of the present invention is not limited to operation in the 1–5 megacycle range. Higher or lower frequencies may also be used. The diameter of the transducers is determined only by the amount of power it is desired to transmit while the thickness of the transducers is an intimate function of the frequency of operation; an inverse relation between transducer thickness and frequency of operation being a constant for the particular transducer material chosen.

Electrically coupled to a power oscillator 16 is the conductor means 18; one end of the conductor means 18 being electrically connected to the external transducer 14.

As indicated at FIG. 1, the internal transducer 10 is in abutting relation with the interior surface of the missile skin 12. The transducer 10 may be bonded to the interior of the missile skin or otherwise placed in intimate contact therewith. Situated within the missile is the arming and disarming circuitry designated generally by the reference number 20; the arming and disarming circuitry 20 being electrically coupled with the interior transducer 10 via the conductor means 22.

Operationally, electrical energy from the power oscillator 16 excites the exterior transducer 14. The exterior transducer 14, being electrically energized by the power oscillator 16, converts the received electrical energy into ultrasonic energy. The ultrasonic vibrations of the transducer 14 are transmitted through the missile's skin 12 to the interior transducer 10. Transducer 10, being sonically excited reconverts the sonic energy it receives into electrical energy which, in turn, is transmitted via conductor means 22 to the arming and disarming circuitry 20.

Shown at FIG. 2 in a generalized schematic fashion is a system for transmitting direct current energizing signals to the arming and disarming circuitry 20. As shown, serially coupled with the conductor means 22, intermediate the interior transducer 10 and the arming and disarming circuitry 20, there is a rectifying and filtering circuit means designated generally by the reference number 24. The rectifying and filtering circuitry 24 comprises the diode 26, the by-pass capacitor 28 and the coil 30. In addition, a common path designated generally by the reference number 32 is provided: the common connection 32 being provided as shown at FIG. 2 for the power oscillator 16, the missile's skin 12, the capacitor 28, the coil 30 and the arming and disarming circuitry 20. Operationally the alternating current signal provided at the output of the power oscillator 16 will cause the transducers 14 and 10 to vibrate in a thickness mode. However, the action of the rectifying and filtering means 24 couples only the unidirectional signal from the transducer 10 with the arming and disarming circuitry 20.

The schematic illustration at FIG. 2 is equally useful for describing another embodiment of the invention. Assume that a portable transistorized radio receiver 20 has its battery removed and is situated on one side of a barrier 12; the barrier 12 being, for example, an aluminum or steel plate. By using the circuitry shown at FIG. 2, the radio receiver 20 receives a D.C. potential from the oscillator 16 to enable the reception of R.F. broadcast transmissions.

Shown at FIG. 3 is another embodiment, in block diagram form, of the invention. In this embodiment a power oscillator 16 is coupled by conductor means 18 with a modulator 34. In one embodiment the power oscillator 16 may provide a fixed output carrier frequency; the frequency being centered on the resonant frequency of the transducers 10 and 14 with respect to barrier 12.

A modulator 34 is situated external of the missile's interior, as is the oscillator 16, and it functions to modulate the fixed frequency output signals from the oscillator 16. The modulator 34 may be an amplitude-modulation device, a frequency-modulation device, a phase-modulation device or a pluse-modulation device. In the case of phase-modulation, the modulator 34 permits pulses of carrier frequency from the power oscillator to be translated to transducer 14.

For a frequency multiplex system using amplitude-modulation the system schematically illustrated at FIG. 3 functions as follows:

The transducer 10 translates a D.C. signal to terminal 22a of the arming and disarming circuitry 20. Serially coupled between the transducer 10 and the terminal 22a is the rectifying and filtering section 24, hereinbefore described. Filtering, provided by the capacitor 28 (in the form of a peak detector) allows all amplitude-modulation frequencies, as well as pulses, to be recovered and appear as low frequency voltage presented to the band-pass filters 46a . . . 46n. (The functioning of these band-pass filters is discussed in more detail, hereinafter.)

The resistor 40 and the capacitor 42 serve as a filter section to remove the low-frequency components of the D.C. potential across the capacitor 28 and translates power to the terminal 22a.

The amplitude modulated signal generated by the transducer 10 is translated through the coupling capacitor 44 to a bank of band-pass filters 46a, 46b, 46c . . . 46n. The output signals from each of the filters 46a . . . 46n are delivered to the input terminals 48a, 48b, 48c . . . 48n of the arming and disarming circuit 20. Each of the band pass filters 46a . . . 46n are designed so as to pass a different range of frequencies. For example, a different side band spectrum of the frequency of the oscillator 16, as modulated by the modulator 34. Accordingly, a frequency multiplex system may be used for arming or disarming the missile. Various circuits responsive only to a specific side band spectrum may be linked within the arming and disarming circuitry 20 to "command" the arming and disarming functions.

Alternatively, the modulator 34 may be operated as a keyer so that a binary code signal may be used by the arming and disarming circuitry 20.

For frequency, or phase, modulation the filters 46a . . . 46n can be preceded by a discriminator as is conventional for detecting frequency or phase modulation signals.

The apparatus illustrated at FIG. 4 is particularly suited for the arming and disarming of a missile which is intended to be launched from a pylon member of an airborne vehicle. With the missile skin 12, the transducer 10 is mounted in intimate contact with the interior surface of the skin 12. The electrical connection means 22 is bonded with the transducer 10 and intended to translate the electrical energy generated by the transducer 10 to the various circuit and networks; e.g., any of those illustrated at FIGS. 1–3. Exterior of the missile is the pylon structure 50 shown in section at FIG. 4, the missile 12 being carried on the pylon structure 50 by means (not shown) which are well known. Situated within the pylon 50 is a metal block 52. As indicated, the bottom surface of the metal block 52 is arranged for intimate contact with the outer surface of the missile's skin 12. Bonded to the metal block 52 is an external transducer element 14. The transducer 14 is connected to the conductor means 18a. Mounted atop the block 52 is a hollow coupling 54 to which a conduit (shown in dotted lines) containing the conductor means 18 is coupled with the power oscillator and modulator within the aircraft.

Shown at FIG. 5 is another means of sonically coupling the exterior and interior transducers. As shown, on the outer surface of the weapon's skin 12, there is a threaded cavity 56, within which the exterior transducer 14 is placed in intimate contact with the plane of the weapon's skin. The leads 18 being coupled between the exterior transducer 14 and the aircraft electronic system. Within the weapon's interior, another transducer 10 is bonded to the surface thereof directly under the exterior tranhducer 14, the leads 22 functioning to translate the electrical energy of the transducer 10 to the various circuits and networks shown at FIGS. 1, 2 and 3. An apertured threaded plug 58 covers the cavity and allows passage of the conductor means 18 to an oscillator.

Shown at FIG. 6 in schematic form is a typical oscillator 16 which may be employed in conjunction with transmitting transducer 14 for transmitting acoustical energy across barrier 12. It will become apparent from the discussion below that the advantage of this oscillator is that it is capable of automatically adjusting to the resonant frequency of barrier 12 in order to transmit the maximum acoustical energy through the barrier.

The circuit is shown connected in part between ground potentials 32 and a positive potential fed into the circuit by conductor 101 from D.C. source 131 through a suitable low pass filter consisting of series inductors 114 and shunt capacitors 116. Transistor amplifier 118 is shown coupled to the primary winding of transformer 126 through tap 123. The base connection 121 of transmitter amplifier 118 is coupled to a voltage divider consisting of resistors 122 and 102 and A.C. bypass capacitor 124 to provide suitable D.C. bias potential to the base 121. The primary of the transformer forms part of a resonant frequency tank circuit having capacitor 104 coupled thereacross to transformer taps 125 and 103. Emitter connection 120 of transistor amplifier 118 is coupled to tap 130 of secondary winding 127. Secondary tap 129 is coupled to one side of transmitting transducer 14. The other electrical connection to transmitter transducer 14 is suitably coupled to ground 32. The positive potential is coupled to emitter 120 of transistor 118 through RF choke 128 and the secondary winding of transformer 126. The emitter 120 is necessarily coupled to the proper tap of the secondary of transformer 126 which will provide a positive feedback signal to the transistor amplifier in order to enable it to oscillate. The A.C. impedance path of emitter 120 to ground is completed through both the secondary winding of transformer 126 and transmitting transducer 14. It is thus apparent that oscillation only occurs when transducer 14 is in resonance since at resonance, the series resonant impedance of transducer 14 and secondary winding 127 as seen by emitter 120 becomes substantially reduced to zero, thereby permitting transistor amplifier 118 to oscillate. The circuit elements of the oscillator circuit consisting of capacitor 104 and the primary winding of transformer 126 are initially adjusted to within a few percent of the expected resonant frequency of transducer element 14 in conjunction with barrier 12. Thus depending upon the different physical constructions of the barrier to which transducer element 14 is attached, the oscillator has the capability of automatically adjusting to the resonant frequency of the transducer and the barrier to thereby provide the maximum acoustical energy transfer possible. Thus changes in the physical construction of barrier 12 as sensed by the adjacent surface of transducer 14 secured thereagainst cause the oscillator circuit 16 to correspondingly change frequency in order that emitter 120 of transistor 118 seeks the lowest impedance path to ground through the series resonance circuit of the secondary winding 127 and transducer 114. Transducer elements 14, which are normally piezoelectric crystals, have the physical characteristics such that for frequencies immediately on either side of the resonant frequency of the crystal and barrier 12, the series circuit will exhibit an extremely high impedance thereacross and thus inhibit the amplifier from oscillation. It can therefore be appreciated that the improvement of this oscillator circuit in driving transducer 14 secured against barrier 12 is that it will automatically permit the maximum acoustical energy to be transferred across the barrier by tuning the amplifier to oscillate at the resonant frequency.

Power oscillator 16 need not be limited to operate from a positive potential but may employ an oppositely doped transistor amplifier to function from a negative potential. Likewise it is conceivable that the amplifier may be constructed from suitable vacuum tube circuitry.

In addition, the power oscillator 16 may be suitably modulated by any number of conventional means such as by selectively interrupting conductor 101 to provide pulse information bearing signals or by controlling the amplitude of the oscillation.

The system and apparatus for disarming and arming warhead carrying missiles, hereinbefore described and illustrated in the accompanying drawing figures, is to be considered as being an illustrative example only of the invention. Many changes, substitutions for and other arrangements of the means hereinbefore described may be made without departing from the spirit and scope of the invention which is defined by the claims hereinafter set forth.

What I claim is:

1. A system for ultrasonic translation of electrical energy through the wall of a housing to a load situated within said housing from an electrical energy source situated outside of the housing without breaching the housing, comprising: first transducer means within said housing and contiguous with the surface portion of the wall of the housing, said first transducer means being capable of converting vibrations of said wall of the housing into electrical energy; first conductor means for translating the electrical energy of the first transducer to the load; second transducer means outside the housing and contiguous with the surface portion of the wall of the housing substantially opposite of said first transducer means, said second transducer means being capable of converting electrical energy received from the electrical energy source into thickness mode vibrations and causing the wall of the housing to vibrate, said electrical source providing information-bearing signals for driving the second transducer, wherein said electrical energy source comprises;
   a tunable power oscillator means, and means responsive to the resonant frequency of said housing for tuning the oscillator means to that frequency during its operation, and wherein rectifying means is connected in the said first conductor means before said load.

2. The system as recited in claim 1 wherein said means for tuning comprises;
   a tuned circuit coupled in series with said oscillator means to operate said oscillator means when the impedance of said circuit is substantially reduced to zero,
   said circuit including
   a series connection of a fixed impedance means and said second transducer means, said transducer means having an acoustical impedance responsive to the resonant frequency of the housing, so that said circuit will operate and maintain the oscillator means at said resonant frequency.

3. The system as recited in claim 2 wherein said oscillator means includes
   a transformer having primary and secondary windings,
   an amplifier having its high impedance output connected to the primary winding of said transformer, said primary winding including a capacitor coupled thereacross to resonate at approximately the resonant frequency of said housing,
   said amplifier having its low impedance connection coupled to said tuned circuit, said fixed impedance means being the secondary winding of said transformer so as to positively feed back a portion of the signal of said primary winding to cause said amplifier to oscillate.

4. A system for ultrasonic translation of electric power and command signals to arming and disarming circuitry, situated within a weapon, from power and command signal sources, which are situated outside of the weapon, without breaching the weapon housing; said system comprising: first transducer means situated within the weapon housing and in intimate contact with a wall surface thereof, the first transducer means being adapted for providing electrical signals in response to vibration of the weapon housing's wall surface; second transducer means situated outside the weapon housing and placed in intimate contact with a wall surface thereof substantially opposite of said first transducer means; power and command signal source situated outside the weapon housing for electrically exciting the second transducer means whereby the second transducer means causes the weapon housing wall to vibrate; circuit means within the weapon housing for coupling the electrical signals from the first transducer to the weapon's arming and disarming circuitry.

5. A system according to claim 4 wherein said circuit means includes rectifying means, for translating bias voltages to portions of the arming and disarming circuitry.

6. A system as recited in claim 4 wherein said circuit means comprises;
   arming and disarming circuitry,
   a rectifying means connected to said first transducer and providing unidirectional power to said arming and disarming circuitry, and
   a plurality of band-pass filters connecting said first transducer to said above arming and disarming circuitry and responsive to a plurality of discrete electrical signals so as to selectively arm or disarm the weapon system.

7. A system as recited in claim 4 wherein said power and command signal source comprises;
   a power oscillator producing an output carrier frequency,
   a modulator means connecting said power oscillator to said second transducer means, and information means connected to said modulator to modulate the carrier frequency with a signal responsive to arming and disarming the weapon system.

8. The power oscillator as recited in claim 7 wherein said carrier frequency is centered on the resonant frequency of said housing.

9. The information means as recited in claim 7 wherein said carrier frequency is amplitude modulated.

10. The information means as recited in claim 7 wherein said carrier frequency is phase modulated.

11. The information means as recited in claim 7 wherein said carried frequency is frequency modulated.

12. A system as recited in claim 7 wherein said power oscillator additionally comprises a tuned circuit coupled in series with said oscillator to operate said oscillator at the resonant frequency thereof when the impedance of said circuit is substantially reduced to zero, said circut including a series combination of a fixed impedance means and said second transducer means, said transducer means having an acoustical impedance responsive to the resonant frequency of the housing so that said circuit will tune and maintain the power oscillator to operate at said resonant frequency.

13. A system for supplying power and command signals to arming and disarming circuitry, situated within a weapon, from power and command signal sources, which are situated outside of the weapon, without breaching the weapon housing; said system comprising: first transducer means situated within the weapon housing and against a wall surface thereof, the first transducer means being adapted for providing electrical signals in response to vibration of the weapon housing's wall surface; second transducer means situated outside the weapon housing and adapted for being placed in intimate contact with a wall surface thereof; a tunable power oscillator situated outside the weapon housing for electrically exciting the second transducer means whereby the second transducer means causes the weapon housing wall to vibrate, said oscillator producing an output carrier frequency and including a tuned circuit coupled to said oscillator to tune said oscillator to the resonant frequency of said weapon housing, a modulator means connecting said power oscillator to said second transducer means, information means connected to said modulator to modulate the carrier frequency with a signal responsive to arming and disarming the weapon system, arming and disarming circuitry within the weapon housing, rectifying means connected to said first transducer and providing unidirectional power to said arming and disarming circuitry and a plurality of band-pass filters connecting said first transducer to said arming and disarming circuitry and responsive to a plurality of discrete information modulated signals so as to selectively arm and disarm the weapon system.

14. The system as recited in claim 13 wherein said power oscillator includes a transformer having primary and secondary windings, an amplifier having its high impedance output connected to the primary winding of said transformer, said primary winding including a capacitor coupled thereacross to resonate at approximately the resonant frequency of said weapon housing, said amplifier having a low impedance connection coupled to said tuned circuit, said fixed impedance means being the secondary winding of said transformer so as to positively feed back a portion of the signal of said primary winding to cause said amplifier to oscillate.

References Cited
UNITED STATES PATENTS

| | | | |
|---|---|---|---|
| 1,390,768 | 9/1921 | Dorsey | 102—18 |
| 2,237,899 | 4/1941 | Bjornson | 181—.5 |
| 2,280,226 | 4/1942 | Firestone | 181—.5 |
| 3,012,503 | 12/1961 | Brown et al. | 102—18 |
| 3,027,837 | 4/1962 | Kendall | 102—18 |
| 3,044,016 | 7/1962 | Frihart et al. | |
| 3,056,957 | 10/1962 | Carlson | 340—15 |
| 3,104,543 | 9/1963 | Kaminski | 181—.5 |
| 3,138,778 | 6/1964 | Dulin | 340—15 |

OTHER REFERENCES

Electronics & Electron Devices, by Albert, The Macmillan Company, N.Y., 1956, TK 7815 A45, pp. 466–468.

BENJAMIN A. BORCHELT, *Primary Examiner.*

W. C. ROCH, *Assistant Examiner.*